United States Patent [19]

Narita et al.

[11] Patent Number: 5,408,625
[45] Date of Patent: Apr. 18, 1995

[54] MICROPROCESSOR CAPABLE OF DECODING TWO INSTRUCTIONS IN PARALLEL

[75] Inventors: Susumu Narita, Kokubunji; Fumio Arakawa, Tokyo; Tetsuhiko Okada, Tama; Kunio Uchiyama, Kodaira, all of Japan

[73] Assignee: Hitachi, Ltd., Tokyo, Japan

[21] Appl. No.: 169,728

[22] Filed: Dec. 17, 1993

Related U.S. Application Data

[63] Continuation of Ser. No. 724,536, Jun. 28, 1991, abandoned.

[30] Foreign Application Priority Data

Jul. 20, 1990 [JP] Japan .................... 2-190661

[51] Int. Cl.6 .................... G06F 9/00; G06F 9/30
[52] U.S. Cl. ................. 395/375; 364/232.8; 364/259.9; 364/262.9; 364/265.6; 364/266.3
[58] Field of Search .............................. 395/375

[56] References Cited

U.S. PATENT DOCUMENTS

| Re. 32,493 | 9/1987 | Matsumoto et al. | 395/375 |
| 3,566,366 | 2/1971 | Quinn et al. | 395/375 |
| 5,113,503 | 5/1992 | Sasaki et al. | 395/375 |
| 5,148,528 | 9/1992 | Fite et al. | 395/375 |
| 5,202,967 | 4/1993 | Matsuzaki et al. | 395/375 |

FOREIGN PATENT DOCUMENTS 0354740 4/1990 European Pat. Off. .
63-244233 11/1988 Japan .

OTHER PUBLICATIONS

Kohn, Leslie, et al. "Session 3: Floating-Point Processors," IEEE International Solid-State Circuits Conference, 1993, pp. 54–55. (English)

*Primary Examiner*—Parshotam S. Lall
*Assistant Examiner*—Ayni Mohamed
*Attorney, Agent, or Firm*—Fay, Sharpe, Beall, Fagan, Minnich & McKee

[57] ABSTRACT

An instruction fetch unit IU in a microprocessor capable of decoding two instructions in parallel fetches first and second instructions of the shortest instructions in one cycle. The fetched first instruction is supplied to and decoded by a first instruction decoder ID0, while the fetched second instruction is supplied to and decoded by a second instruction decoder ID1. In a case where an instruction having a bit width longer than the shortest instruction has been fetched by the instruction fetch unit IU, information to be decoded by the second instruction decoder ID1 is the non-head code of the instruction, and hence, a pipeline control unit PCNT invalidates the decoded result of the second instruction decoder ID1. Thus, it is permitted to decode the two shortest instructions in parallel, and to eliminate the erroneous information of the decoded result of the second decoder in the case of the fetch of the non-shortest instruction.

3 Claims, 3 Drawing Sheets

CONTROL SIGNALS
BY PARALLEL DECODE

CONTROL SIGNALS
BY SINGLE DECODE

MICROPROCESSOR CAPABLE OF DECODING TWO INSTRUCTIONS IN PARALLEL

This is a continuation of application Ser. No. 07/724,536, filed Jun. 28, 1991, now abandoned.

BACKGROUND OF THE INVENTION

1. Field of the Invention

The present invention relates to a microprocessor which is capable of processing a variable-length instruction set and which decodes a plurality of instructions in parallel.

2. Description of the Prior Art

In any prior-art microprocessor capable of processing a variable-length instruction set, the parallel decode of instructions is not performed.

As a known example pertinent to the present invention, there is mentioned an instruction decoding method stated in a treatise "32-bit microprocessor V80 wherein the disturbance of a pipeline is suppressed by building in a cache and a branch prediction mechanism, etc., thereby to enhance a performance" contained on pp. 195–206 in NIKKEI ELECTRONICS BOOKS "New-Generation Microprocessors RISC, CISC, TRON" published on Sep. 11, 1989.

In the known microprocessor, a plurality of instructions are not really decoded in parallel, but an instruction is decoded in two stages, thereby to enhance the throughput of decode capability. The first-stage decode circuit of this known microprocessor is called a pre-decode unit, which has the function of decomposing a variable-length instruction into elements of fixed length. The instruction decomposed into the fixed-length elements in this manner is once stored in a buffer (register) within the pre-decode unit, and it is transferred from the pre-decode unit to an instruction decode unit in compliance with the request of the instruction decode unit.

Meanwhile, the official gazette of Japanese Patent Application Laid-open No. 244233/1988 discloses a microprocessor which is intended to shorten the decode time period of a variable-length machine language by decoding a plurality of unit instructions in parallel. With the microprocessor, the machine language instructions of 2 bytes are accepted from outside each time, and the unit instruction of the first byte and that of the second byte are respectively decoded by a first decoder and a second decoder. A first selector selects one decoded result from among a plurality of decoded results delivered from the first decoder. A second selector selects one decoded result from among a plurality of decoded results delivered from the second decoder, in accordance with the decode information delivered from the first selector. The select operation of the first selector is determined in accordance with the decode information delivered from the second selector. According to the microprocessor thus constructed, the machine language instructions of 2 bytes can be decoded in one machine cycle, and the decode time period of the variable-length instruction can be shortened.

SUMMARY OF THE INVENTION

The inventors' study, however, has revealed that, with the prior-art technique disclosed in the aforementioned treatise, two problems are involved in case of raising the speed of the processing of the microprocessor still more.

The first problem is that, since the instruction decode uses the two stages in the pipeline, branch processing slows down to the corresponding extent.

That is, in a case where the branch processing is started and is followed by fetching and pre-decoding a branch destination instruction, a time period expended on the branch increases to the amount of one stage more than in a microprocessor which requires only one stage for decode processing.

As the second problem, in a case where the method of decoding an instruction in two stages as in the prior-art technique is adopted in a microprocessor which executes a plurality of instructions in parallel the pre-decode unit governs the performance of the whole microprocessor. The reason is that, since the instruction to be processed is in the state of a variable length, the succeeding instruction cannot be pre-decoded unless the pre-decode unit pre-decode the preceding instruction. That is, the pre-decode unit can pre-decode only one instruction at a time.

It has also been revealed by the inventors' study that there are three solving methods for the second problem.

The first solution is that a plurality of pre-decode circuits for pre-decoding a plurality of instructions are connected in series. Herein, the succeeding pre-decode circuit refers to the output of the preceding pre-decode circuit. Moreover, the plurality of pre-decode circuits are designed so as to be operable within one cycle. Then, the problem can be solved. In this case, however, the delay time of the pre-decode circuits connected in series becomes problematic.

The second solution is the method in which the pre-decode unit is endowed with a performance capable of pre-decoding one instruction in one cycle, whereupon the difference between the processing performances of the pre-decoder and the instruction decoder is absorbed by a buffer arranged between them. Since, however, the maximum throughput becomes one instruction/cycle with this method, the performance of the microprocessor is not considerably enhanced in spite of the fact that the microprocessor is specially permitted to execute the plurality of instructions at the other stage.

The third solution is that, as in the present invention, the succeeding instruction is decoded by placing any assumption on the format of the preceding instruction.

The present invention has been made in practicably realizing the third solution, and has for its object to provide a microprocessor which can decode a plurality of instructions at high speed and in parallel in case of processing a variable-length instruction set.

Meanwhile, regarding the prior-art technique disclosed in the aforementioned official gazette of Japanese Patent Application Laid-open, the inventors' study has revealed the following disadvantage: In order to decode all the patterns of the unit instructions, a large number of instructions need to be decoded in parallel in the first and second instruction decoders, and one decoded result need to be selected from among a large number of decoded results by the selectors. Therefore, the hardware quantities of the instruction decoders and the selectors become enormous.

It is accordingly another object of the present invention to provide a microprocessor which can decode a plurality of instructions at high speed and in parallel while restraining the quantity of its hardware to the minimum.

In order to accomplish the objects, according the present invention, an instruction is decoded under the assumption of the instruction length thereof.

Subsequently, when the assumption has been found correct by the decode of the instruction, the decoded result of a succeeding instruction is also judged correct. To the contrary, when the assumption has been found erroneous, the decoded result of the succeeding instruction is Judged erroneous, and it is invalidated.

Further, the assumptive instruction length should desirably be the length of the shortest instruction format in an instruction set. The reason is that the instruction format which is the shortest in the variable-length instruction set corresponds to instructions of high frequence in use, so the assumption holds good at a high probability.

Besides, in order to decode a plurality of instructions in parallel, an instruction prefetch unit transfers an instruction code whose length is at least double the shortest instruction format, to an instruction decode unit.

In the instruction decode unit, the instruction code is input to individual instruction decoders every length of the shortest instruction format. Each of the instruction decoders is capable of decoding, at least, the instructions having the shortest instruction format, and at least one of the instruction decoders is capable of decoding all the instructions of the instruction set. It is also possible to hold the outputs of the respective instruction decoders in output latches different from one another.

A microprocessor according to a typical embodiment of the present invention is outlined as follows:

The microprocessor is characterized by comprising:
(1) a fetch unit (IU) which fetches first and second instructions each having an instruction length of predetermined bit width (16 bits), from outside said microprocessor, and which delivers the first and second instructions to output lines in parallel, said output lines having a bit width (32 bits) that is at least double the predetermined width;
(2) a first instruction decoder (ID0) whose input is supplied with the first instruction on said output lines of said fetch unit (IU);
(3) a second instruction decoder (ID1) whose input is supplied with the second instruction on said output lines of said fetch unit (IU);
(4) a control unit (PCNT) which is supplied with a decoded result (id0_out) of said first instruction decoder and that (id1_out) of said second instruction decoder; and
(5) an instruction execution unit (EU) which responds to an output from said control unit (PCNT);
wherein under a condition under which the first instruction of the predetermined instruction length is delivered from said output lines having the bit width that is at least double the predetermined width, said control unit (PCNT) responds to information on fulfillment of the condition in the decoded result (id0_out) of said first instruction decoder (ID0) and validates the decoded result (id1_out) of said second instruction decoder (ID1), so that said instruction execution unit (EU) executes the first instruction and the second instruction in parallel in response to the decoded results (id0_out, id1_out) of said first and second instruction decoders transmitted as the output of said control unit;
whereas under another condition under which an instruction having an instruction length different from the predetermined bit width is delivered from said output lines of said fetch unit (IU), said control unit (PCNT) responds to information on fulfillment of the other condition in the decoded result (id0_out) of said first decoder (ID0) and invalidates the decoded result (id1_out) of said second decoder (ID1), so that said instruction execution unit (EU) executes the first instruction in response to the decoded result (id0_out) of said first instruction decoder (ID0) transmitted as the output of said control unit (PCNT).

It is decided whether or not the instruction codes processed by the instruction decoders correspond to the instructions which can be decoded by the respective instruction decoders (that is, the instructions which have the shortest instruction format). In a case where, as the result of the decision, any of the instruction decoders has decoded the instruction having any different instruction format, the decoded results of the instruction codes succeeding the particular instruction are all invalidated. The invalidation is readily realized using a control circuit. To the contrary, in a case where, as the result of the decision, all the instruction decoders have decoded the instructions having the shortest instruction format, all the decoded results are valid. On this occasion, the throughput of the instruction decode is the maximum, and the instructions equal in number to the instruction decoders are processed in one cycle.

Thus, the maximum throughput of the instruction decode can be rendered two or more instructions/cycle though subject to the cases of the correct assumption, and the second problem stated before can be solved. Moreover, since the instruction length is assumed, the variable-length instruction need not be decomposed into the fixed-length elements by the pre-decode circuit, and the first problem stated before can be solved.

In addition, according to the present invention, the second instruction decoder executes significant decode concerning only the instruction head code of the instruction (in other words, one sort of decode), and the insignificant decoded result of the second instruction decoder is invalidated under any other condition (in other words, in case of a non-head code). Therefore, the plurality of instructions can be decoded at high speed and in parallel while the hardware quantity of the second instruction decoder is restrained to the minimum.

Unlike the pre-decoding method hitherto known, the instruction decoding method of the present invention decodes an instruction under an erroneous assumption in a certain case. In this case, the decoded result is invalidated as described above, and the throughput becomes one instruction/cycle. In this manner, the processing performance depends upon the instruction format more in the method of the present invention than in the pre-decoding method. This point can be coped with in such a way that the instructions which have the format fulfilling the assumption are used to the utmost in a program.

Other objects and features of the present invention will become apparent from the ensuing description of embodiments taken in conjunction with the accompanying drawings.

BRIEF DESCRIPTION OF THE DRAWINGS

FIG. 6(A) shows the changes of control signals which are generated by instruction decode in the case where the instruction row in FIG. 3 is executed by the microprocessor in FIG. 1, while

DESCRIPTION OF THE PREFERRED EMBODIMENTS

Figure 1:
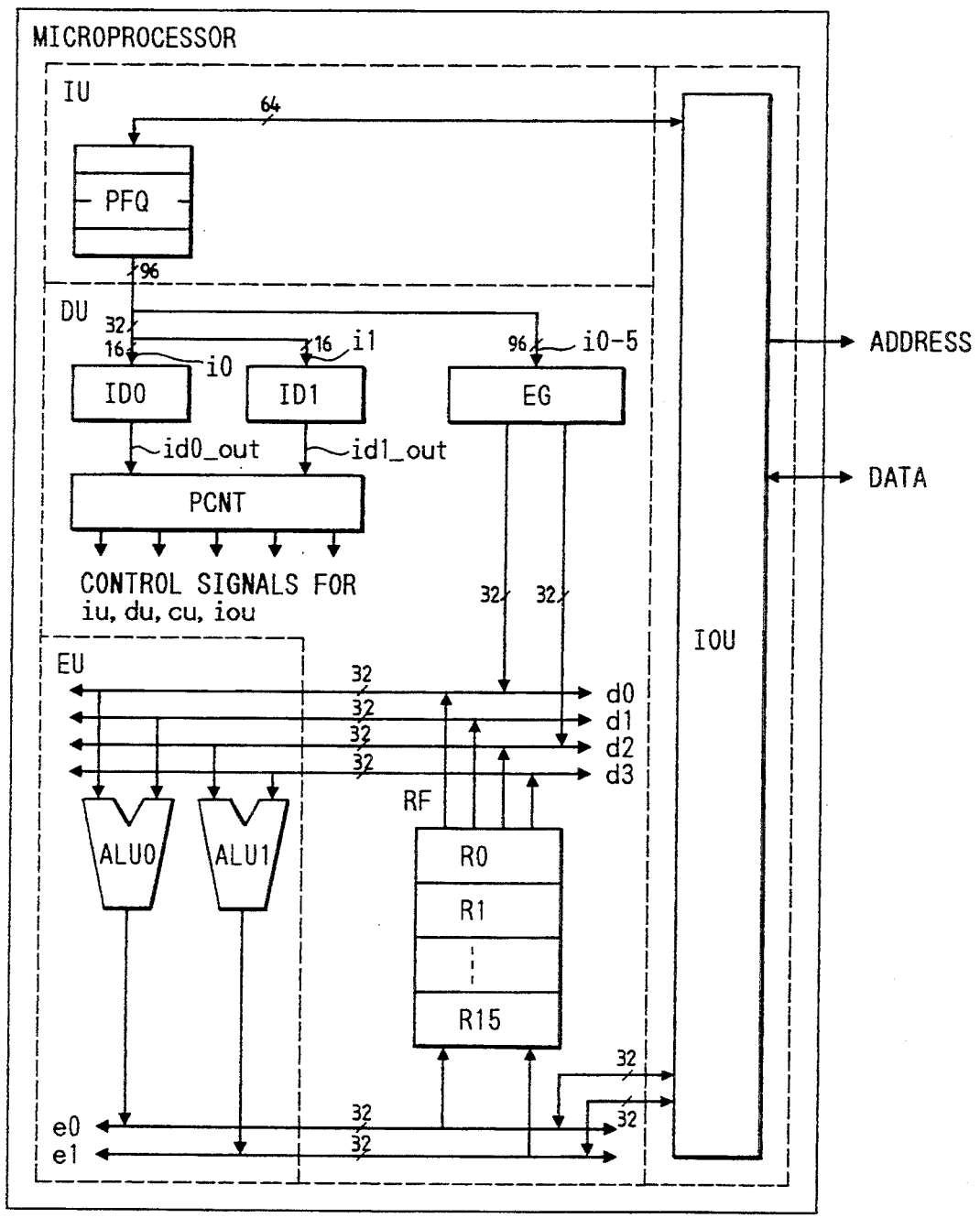
FIG. 1 shows a block diagram of a microprocessor which is an embodiment of the present invention.

FIG. 1 is a block diagram of a microprocessor to which the present invention is applied. The present invention makes it possible to decode a plurality of instructions in parallel. Here will be described the internal architecture and operation of the microprocessor which decodes two instructions in parallel as the simplest aspect of the parallel decode of the plurality of instructions.

Internal Architecture of Microprocessor

First, the internal architecture of the microprocessor will be described with reference to FIG. 1. The microprocessor in FIG. 1 is basically constructed of an interface unit IOU, an instruction prefetch unit IU, an instruction decode unit DU and an execution unit EU. These units are capable of parallel operations, and pipeline processing is performed under the control of the instruction decode unit DU.

Interface Unit IOU

The microprocessor is connected with external devices (for example, a main memory) through the interface unit IOU. This interface unit IOU transfers both instructions and data between the microprocessor and the main memory.

More specifically, an instruction fetched from the main memory is transferred from the interface unit IOU to the instruction prefetch unit IU through signal lines having a width of 64 bits.

On the other hand, data computed by the execution unit EU is transferred from this execution unit EU to the interface unit IOU through signal lines in two sets each consisting of 32 bits, while data fetched from the main memory is transferred from the interface unit IOU to the instruction decode unit DU.

Instruction Prefetch Unit IU

The instruction prefetch unit IU has a prefetch queue PFQ. The instructions transferred from the interface unit IOU are once latched in the prefetch queue PFQ and aligned in 16-bit unit, whereupon the aligned instructions are delivered to the instruction decode unit DU. The prefetch queue PFQ is a queue of FIFO (First-In First-Out).

The instructions after the alignment are transferred from the instruction prefetch unit IU to the instruction decode unit DU through six sets of 16-bit signal lines i0–i5. Here, the signal line i0 bears the head code of the instruction to be decoded in the next machine cycle, and the signal lines i1–i5 bear the row of the instructions succeeding the instruction of the signal line i0. The signal line i0 is connected to a first instruction decoder ID0. Similarly, the signal line i1 is connected to a second instruction decoder ID1. It is the feature of the embodiment of the present invention that the input of the second instruction decoder ID1 is uniquely determined by the signal of the signal line i1 and is not selected from among the signals of the signal lines i1–i5. Besides, the first instruction decoder ID0 has the function of decoding all instructions which can be processed by the microprocessor. In contrast, the second instruction decoder ID1 can decode only instructions in an instruction format having a length of 16 bits or 32 bits, among the instructions which the microprocessor can execute. The decoded results of the instructions in the first instruction decoder ID0 and the second instruction decoder ID1 are respectively delivered to signal lines id0_out and id1_out and then sent to a pipeline control unit PCNT.

Pipeline Control Unit PCNT

The pipeline control unit PCNT generates control signals for the units IOU, IU and EU on the basis of the signals of the signal lines id0_out and id1_out and signals (not shown in the figure) indicating the statuses of these Units IOU, IU and EU.

Expansion Part Generator EG

In addition, the instruction decode unit DU includes an expansion part generator EG, by which immediate data or displacement data in the instructions is expanded to 32 bits and then delivered. The position and length of the immediate data or displacement data in any instruction are designated in the operation code of the instruction, and the data is obtained by decoding the operation code. The expansion part generator EG processes the data on the basis of the designation, and delivers the processed data to a bus d0 or d1. The reason why the expansion part generator EG has two sets of 32-bit output lines, is that the data items are transferred independently under the respective controls of the first instruction decoder ID0 and the second instruction decoder ID1.

Execution Unit EU

Two integral arithmetic logic units ALU are similarly disposed in the execution unit EU so as to correspond to the first instruction decoder ID0 and the second instruction decoder ID1, respectively.

Register File RF

A register file RF in the instruction decode unit DU is configured of sixteen 32-bit registers R0 thru R15. Each of the registers has four read ports and two write ports, totaling six ports. Among these ports, one half (two read ports and one write port) corresponds to the side of the first instruction decoder ID0 and is connected to the first arithmetic logic unit ALU0. Likewise, the ports of the other half correspond to the side of the second instruction decoder ID1 and are connected to the second arithmetic logic unit ALU1.

Signal Lines of 32-bit Width

The instruction decode unit DU and the execution unit EU are connected by six sets of signal lines d0, d1, d2, d3, e0 and e1 each having a width of 32 bits. Among them, the four sets (d0, d1, d2, d3) are used for transferring data from the instruction decode unit DU to the execution unit EU, while the remaining two sets (e0, e1) are used for transferring data from the execution unit EU to the instruction decode unit DU.

By way of example, let's consider a case where the first arithmetic logic unit ALU0 processes the instruction of adding the values of the registers R0 and R1 and then setting the sum in the register R1. In this case, the values of the registers R0 and R1 are first read out from the register file RF and respectively delivered to the 32-bit signal lines d0 and d1. At the next execution stage to the instruction decode unit DU in the pipeline, that is, in the execution unit EU, the first arithmetic logic unit ALU0 receives the values from the signal lines d0 and d1 and adds them up. The result of the addition is delivered to the signal lines e0. Further, at the stage of register store which is the next processing, the processing proceeds in the instruction decode unit DU again, and the value on the signal lines e0 is set in the register R1 within the register file RF. The above is an operation employing the side of the first instruction decoder ID0. In case of employing the side of the second instruction decoder ID1, the signal lines d2, d3 and e1 and the second arithmetic logic unit ALU1 are used. More specifically, the values of the registers R0 and R1 are respectively delivered to the signal lines d2 and d3, and they are added by the second arithmetic logic unit ALU1. Thereafter, the result of the addition is transferred to the register R1 by the use of the signal lines e1.

In the case of transferring data between the microprocessor and the memory, signal lines in two sets each consisting of 32 bits as laid between the signal lines e0, e1 and the interface unit IOU are used. Since the operation of this part is not directly relevant to the present invention, it shall be omitted from description.

The effect of the present invention is that the parallel decode of a plurality of instructions becomes possible. In this embodiment, the microprocessor having the instruction set of variable-length instructions will be taken as an example. Therefore, what the variable-length instruction is will be first explained briefly.

Variable-length Instruction

In short, the "variable-length instruction" means an instruction which has a plurality of instruction formats and whose length changes when the different instruction formats are taken. In other words, an instruction set including any instruction of different length has the instruction of variable length.

Fixed-length Instruction

In contrast, a case where all instructions have a fixed length is generally called an "instruction set of fixed length".

Instruction Set of This Embodiment

Figure 2:
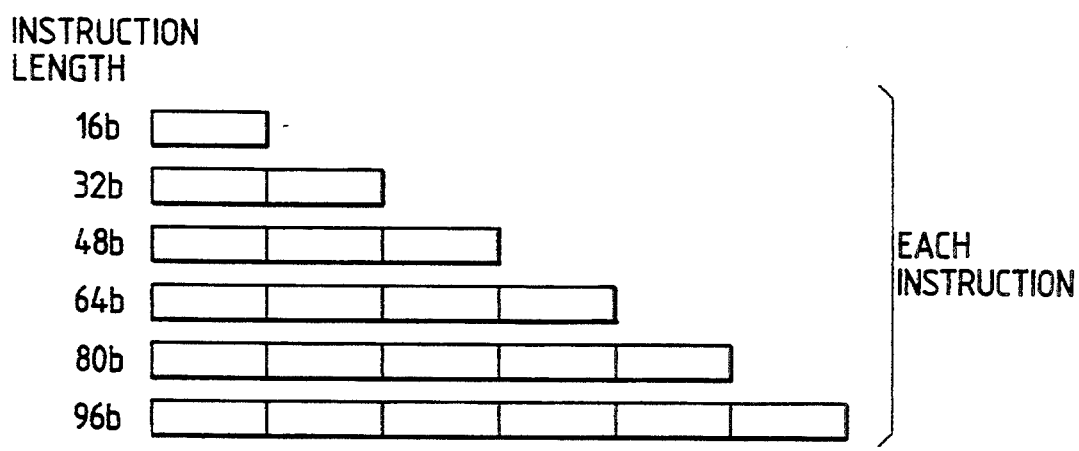
FIG. 2 shows the six sorts of instruction lengths of a variable-length instruction set which the microprocessor of the embodiment has.

As shown in FIG. 2, this embodiment assumes the set of instructions which have six sorts of lengths of 16 bits thru 96 bits in 16-bit unit. In the memory, the instructions are located bordering every 16 bits. That is, the 16-bit elements of the instructions are all located at addresses of even-numbered bytes. This situation is illustrated in FIG. 3.

Next, the operation of the parallel decode of instructions in this embodiment will be described.

Figures 3, 4A, 4B:
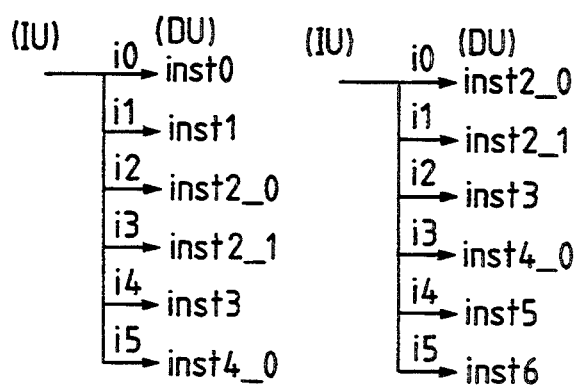
FIG. 3 shows an example of the row of instructions in a memory as to the instruction set of the embodiment.
FIGS. 4(A) and 4(B) show the values of signal lines i0–i5 in the case where the microprocessor shown in FIG. 1 executes the instruction row in FIG. 3, as to two certain points of time.

FIG. 3 shows one example of the row of instructions in the memory. The individual instructions are indicated as, for example, inst0 and inst1. The instruction whose length exceeds 16 bits is indicated as, for example, inst2_0 and inst2_1 by further affixing lower bars and numerals. That is, the instruction longer than 16 bits is divided into a plurality of elements. It is also assumed that a code which must be subjected to decode processing in each instruction is limited to the head code of the instruction. In other words, it is assumed that the non-head code of each instruction is immediate data or displacement data. In the case of the instruction inst2 by way of example, the first code inst2_0 needs to be decoded, but the succeeding code inst2_1 need not be decoded.

Under the above premises, FIGS. 4(A) and 4(B) show the statuses of the 16-bit signal lines i0–i5 at two certain points of time, the signal lines constituting the transfer bus from the instruction prefetch unit IU to the instruction decode unit DU. FIG. 4(A) illustrates the statuses in which the instruction row in FIG. 3 has already been accepted in the prefetch queue PFQ of the instruction prefetch unit IU, and in which the first instruction inst0 is about to be decoded. In the first half of the next machine cycle, the first instruction inst0 is decoded by the first instruction decoder ID0, and the succeeding instruction inst1 by the second instruction decoder ID1. As the results of the decoding, it is found that the two instructions inst0 and inst1 are both in the instruction format having the shortest length. Then, a command is issued from the instruction decode unit DU to the instruction prefetch unit IU so as to advance the pointer of instructions to the amount of 32 bits. In consequence, after a further half machine cycle, the signal lines i0–i5 between the instruction prefetch unit IU and the instruction decode unit DU fall into the statuses shown in FIG. 4(B) in which the two instructions inst0 and inst1 have been taken away and in which the instructions inst5 and inst6 are added instead. On this occasion, the instruction code inst2_0 is decoded by the first decoder ID0, and the instruction code inst2_1 by the second decoder ID1. As the decoded result of the instruction code inst2_0 in the first decoder ID0, it is found that the instruction inst2 is not in the instruction format having the shortest length.

In a case where the shortest instruction is input to the first instruction decoder ID0, the head operation code of the next instruction is input to the second instruction decoder ID1. The second instruction decoder ID1 decodes the instruction, assuming such input of the head operation code of the next instruction. Therefore, in a case where the instruction decoded in the first instruction decoder ID0 is a non-shortest instruction, the instruction decode in the second instruction decoder ID1 is judged erroneous. The judged result of the error is reflected in the output id0_out of the first instruction decoder ID0, and invalidation processing is performed in the pipeline control unit PCNT in response to this judged result. As shown in FIG. 1, the decoded results, namely, the outputs id0_out and id1_out are sent from the first and second instruction decoders ID0, ID1 to the pipeline control unit PCNT. The output id0_out contains information indicating whether or not the instruction decoded in the first decoder ID0 is in the instruction format of the shortest length. On the other hand, the output id1_out may well contain information indicating that the instruction which the second decoder ID1 cannot decode has been input. In this embodiment, however, it is supposed that such information is not contained in the output id1_out.

The decoded result of the second instruction decoder ID1 must be invalidated in conformity with the information contained in the output id0_out as indicates that the length of the instruction having been input to the first instruction decoder ID0 is not the shortest or 16 bits. The processing for the invalidation is performed by the pipeline control unit PCNT as stated above.

Detailed Block Diagram of Pipeline Control Unit PCNT

Figure 5:
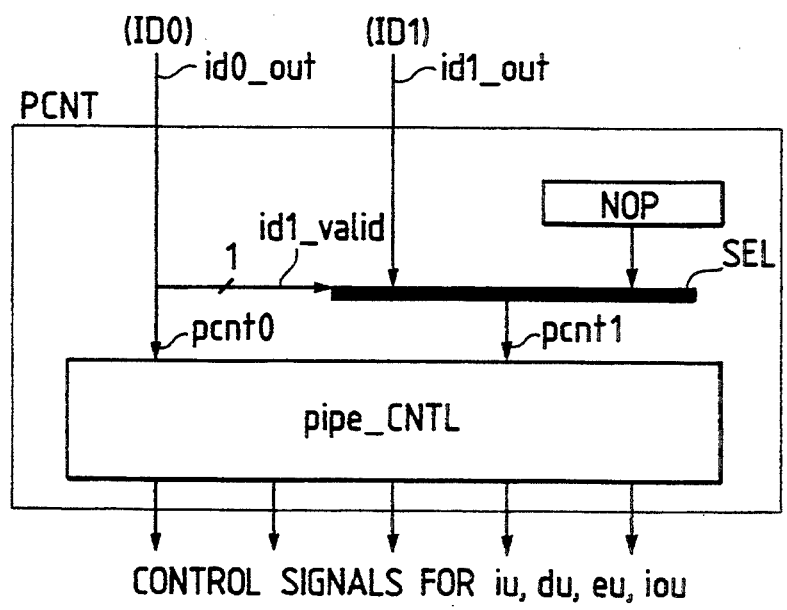
FIG. 5 shows a detailed arrangement diagram of a control circuit PCNT which is one of the constituents of the microprocessor in FIG. 1.

FIG. 5 shows a detailed block diagram of the pipeline control unit PCNT.

The pipeline control unit PCNT is configured of a pipeline stage control unit Pipe_CNTL, a selector SEL and a no-operation command unit NOP, and it controls the pipeline operation of the whole microprocessor on the basis of the outputs id0_out, id1_out and the statuses of the respective units (IU, DU, EU, IOU). The processing stages in the pipeline processing are controlled by the pipeline stage control unit Pipe_CNTL of the pipeline control unit PCNT in FIG. 5. Besides, the invalidation processing for the output information of the second instruction decoder ID1 is performed on this side of the pipeline stage control unit Pipe_CNTL.

More specifically, the output id1_out of the second instruction decoder ID1 is invalidated as follows: This output id1_out of the second instruction decoder ID1 is supplied to one input of the selector SEL. In this embodiment, another input of the selector SEL is supplied with a fixed value NOP through not especially restricted. The fixed value NOP has quite the same fields as those of the output id1_out, and affords a non-execution command instruction called "no operation". The value NOP may be either identical to or different from the decoded information of an "nop" instruction which is generally employed as the instruction for commanding no operation. Necessary is that the instruction NOP commands no operation, and the size of data to be handled, for example, may be designated to any value. The selection of either of the value NOP and the output id1_out in the selector SEL is done in accordance with the information id1_valid which is contained in the output id0_out being the decoded result of the first instruction decoder ID0 and which indicates whether or not the full length of the instruction decoded by the first instruction decoder ID0 is 16 bits. In a case where the instruction length is 16 bits, the output id1_out is selected. To the contrary, in a case where the instruction length exceeds 16 bits, the value NOP is selected. In this way, pipeline control signals pcnt0 and pcnt1 are obtained.

Figure 6A:
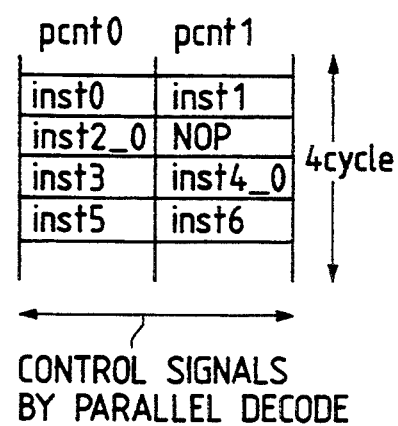

Let's suppose the execution of the instruction row in FIG. 3 again. The changes of the pipeline control signals pcnt0 and pcnt1 on this occasion are shown in FIG. 6(A). It should be noted that, unlike FIG. 3, FIG. 6(A) represents time in the vertical direction thereof. By way of example, when the statuses in FIG. 4(A) shift into the statuses in FIG. 4(B), the instructions inst0 and inst1 are decoded. This situation is indicated at the uppermost line in FIG. 6(A). In the next machine cycle, the instruction codes inst2_0 and inst2_1 are decoded, and the decoded result of the instruction code inst2_0 and the fixed value NOP are respectively delivered as the signals pcnt0 and pcnt1. Thenceforth, the execution proceeds similarly, and the instructions inst0 thru inst6 are subjected to the decode processing in 4 machine cycles.

Figure 6B:
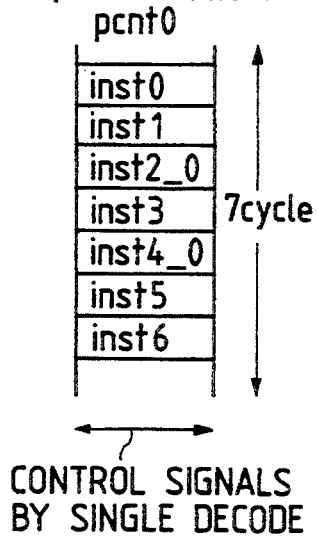
FIG. 6(B) shows the changes of control signals in the case of employing an architecture in which the microprocessor in FIG. 1 includes only one instruction decoder.

Shown in FIG. 6(B) are the changes of the control signal pcnt0 in the case of the prior art where processing similar to the above is performed using only the first instruction decoder ID0. In this case of the prior art, 7 machine cycles are required for the decode processing of the instructions inst0 thru inst6 as illustrated in FIG. 6(B).

Thus, in this embodiment, an instruction decoding capability double higher is attained at the peak, and a capability equal to one attained with the single instruction decoder is attained even in the worst case.

Now, the processing of the instructions inst0, inst1 and inst2_0, inst2_1 will be described as to more practicable examples. As the examples, it is assumed that the instruction inst0 is the fixed-length instruction of adding the values of the registers R0 and R1 and then setting the result in the register R1, that the instruction inst1 is the fixed-length instruction of adding the values of the registers R2 and R3 and then setting the result in the register R3, and that the instruction inst2 is the variable-length instruction of adding displacement data to the value of the register R4 to obtain an address and then fetching the data of the address from the main memory and setting it in the register R5. Here, the instruction code inst2_0 is the operation code, and the instruction code inst2_1 is the displacement data.

First, the processing of the instructions inst0 and inst1 will be described.

The two instructions inst0 and inst1 are delivered to the 96-bit signal lines laid from the prefetch queue PFQ, in the manner shown in FIG. 4(A). Then, the instruction inst0 is decoded by the first instruction decoder ID0, while the instruction inst1 is decoded by the second instruction decoder ID1.

In this case, it is decided as the result of the decoding of the instruction inst0 that this instruction inst0 is the shortest instruction. The result of the decision is indicated by asserting the signal id1_valid in the decoded result id0_out. The outputs id0_out and id1_out are respectively delivered as the control signals pcnt0 and pcnt1 through the pipeline control unit PCNT described before. Subsequently, an operation to be stated below is performed by the commands of these control signals.

The value of the register R0 and that of the register R1 are respectively delivered to the signal lines d0 and d1 in accordance with the command of the control signal pcnt0. Simultaneously, the value of the register R2 and that of the register R3 are respectively delivered to the signal lines d2 and d3 in accordance with the command of the control signal pcnt1. Subsequently, the arithmetic logic unit ALU0 adds the values of the signal lines d0 and d1 and delivers the sum to the signal lines e0, while the arithmetic logic unit ALU1 adds the values of the signal lines d2 and d3 and delivers the sum to the signal lines e1. Further, at the succeeding stage of register store, the value of the signal lines e0 is set in the register R1, and the value of the signal lines e1 in the register R3.

Next, the processing operation of the instruction inst2 will be described.

The instruction inst2 is delivered to the 96-bit signal lines laid from the prefetch queue PFQ, in the manner shown in FIG. 4(B). Then, the instruction code inst2_0 is decoded in the first instruction decoder ID0, while the instruction code inst2_1 is decoded in the second instruction decoder ID1 under the assumption that it is the head code of the next instruction.

In this case, it is decided as the result of the decoding of the instruction code inst2_0 that the instruction inst2 is a non-shortest instruction. The result of the decision is indicated by negating the signal id1_valid in the decoded result id0 out. The output id0_out is delivered as the control signal pcnt0 through the pipeline control unit PCNT described before. Simultaneously, since the signal id1_valid is negated, the instruction NOP commanding no operation is selected by the selector SEL in the pipeline control unit PCNT and is delivered as the control signal pcnt1. Subsequently, an operation to be stated below is performed by the commands of these control signals.

The value of the register R4 is delivered to the signal lines d0 in accordance with the command of the control signal pcnt0. Also, the displacement data inst2_1 of 16 bits is expanded into 32 bits by the expansion part generator EG, and the expanded data is delivered to the signal lines d1.

Besides, since the command of the control signal pcnt1 is the value NOP, any output is not especially delivered to the signal lines d2 and d3. Subsequently, the integral arithmetic logic unit ALU0 adds the values of the signal lines d0 and d1 (for calculating the address) and delivers the sum to the signal lines e0. The command for the arithmetic logic unit ALU1 is also the value NOP, and any output is not especially delivered to the signal lines e1.

Further, at the succeeding stage, in accordance with the command of the control signal pcnt0, that address of the main memory which is specified by the value of the signal lines e0 is accessed to fetch an operand, and the fetched data is set in the register R5. Since the commands of the control signal pcnt1 for the interface unit IOU and the instruction decode unit DU (register store) are the value NOP, the main memory is not accessed, and any value is not transferred or set to or in any register from the signal lines e1, either.

According to thins embodiment, the throughput of the processing of the whole microprocessor is enhanced, and CPI (the number of machine cycles required for executing one instruction) can be rendered less than one.

Moreover, a plurality of instruction decoders may include only one instruction decoder capable of decoding all the instruction formats. The remaining instruction decoders may have merely the function of decoding the shortest instruction format. Therefore, the decoding of a plurality of instructions can be realized with a small quantity of hardware. This merit results also in reducing the quantities of processing for testing and diagnosing the microprocessor and in shortening the time periods of the processing.

Besides, an instruction code to be input to the plurality of instruction decoders are uniquely divided by the length of the shortest instruction format, and the resulting elements are input to the respective instruction decoders. That is, the inputs of all the instruction decoders are selected with ease. This merit is useful for the realization of a high speed together with the suppression of the quantity of hardware.

The embodiment of the present invention is also applicable to a microprocessor which has a fixed-length instruction set. More specifically, most of the plurality of instruction decoders are permitted to decode only instructions of high frequence in use, whereby the instruction decoders for processing the plurality of instructions in parallel, which have a small quantity of hardware and which operate at high speed, can be realized.

In addition, irrespective of the fixed-length instruction set and the variable-length instruction set, instructions which each instruction decoder is capable of decoding can be determined in correspondence with a circuit which the instruction decoder controls. By way of example, an instruction decoder for controlling an arithmetic logic unit is capable of decoding only arithmetic logic instructions, and for any other instruction, it produces a result indicating that it has failed to decode the instruction. This measure brings forth the effect that the number of signal lines to be laid from the instruction decoder to the controlled circuit decreases.

The present invention makes it possible to decode a plurality of fixed-length instructions in parallel in a variable-length instruction set. As compared with the prior-art method, accordingly, the invention enhances the maximum throughput of an instruction decoding performance.

What is claimed is:

1. A microprocessor comprising:
   a fetch unit which fetches fast and second instructions each having an instruction length of predetermined bit width, from outside said microprocessor, and which delivers the first and second instructions to output lines in parallel, said output lines having a bit width that is at least double the predetermined bit width;
   a first instruction decoder whose input is supplied with the first instruction on said output lines of said fetch unit and which outputs a first decoded result;
   a second instruction decoder whose input is supplied with the second instruction on said output lines of said fetch unit and which outputs a second decoded result;
   a control unit which is supplied with the first decoded result of said first instruction decoder and the second decoded result of said second instruction decoder; and
   an instruction execution unit which responds to an output from said control unit;
   wherein said control unit includes a selector, a first input and a second input of which are respectively supplied with said second decoded result of said second instruction decoder and a non-execution command instruction, and wherein a control input is supplied to the selector for controlling as the output a selection of either the second decoded result or the non-execution command instruction based upon information indicating a determined instruction length of the first instruction relative to the predetermined bit width;
   wherein under a valid-indicating condition said information indicates that the determined instruction length is the predetermined bit length, and said selector selects the second decoded result and said control unit transmits the first decoded result of said first instruction decoder and the second decoded result of said second instruction decoder to the output of said control unit, so that said instruction execution unit executes the first instruction and the second instruction in parallel in response to the decoded results of said first and second instruction decoders transmitted as the output of said control unit; and, wherein under an invalid-indicating condition said information indicates that the determined instruction length is longer than the predetermined bit width, and said selector selects the non-execution command instruction and said control unit transmits the first decoded result of said first instruction decoder and the non-execution command instruction as the output of said control unit in order to invalidate the second decoded result of said second instruction decoder.

2. The microprocessor according to claim 1, wherein said control unit invalidates the second decoded result of said second decoder, said instruction execution unit determines an address of the operand in response to that bit information in said output lines of said fetch unit which corresponds to a bit position of the invalidated second decoded result of said second decoder.

3. The microprocessor according to claim 1, wherein the predetermined bit width is the shortest instruction length.

* * * * *